United States Patent
Rajput et al.

(10) Patent No.: US 12,452,140 B1
(45) Date of Patent: Oct. 21, 2025

(54) METHODS, SYSTEMS, AND COMPUTER READABLE MEDIA FOR PROVIDING END-TO-END MESSAGE INTEGRITY CHECKING FOR SERVICE-BASED INTERFACE (SBI) MESSAGES COMMUNICATED VIA A SERVICE COMMUNICATION PROXY (SCP)

(71) Applicant: Oracle International Corporation, Redwood Shores, CA (US)

(72) Inventors: Jay Rajput, Bangalore (IN); Virendra Singh, Bangalore (IN); Shashikiran Bhalachandra Mahalank, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 18/676,448

(22) Filed: May 28, 2024

(51) Int. Cl.
*G06F 15/16* (2006.01)
*G06F 9/54* (2006.01)
(Continued)

(52) U.S. Cl.
CPC ............ *H04L 41/14* (2013.01); *H04L 63/123* (2013.01); *H04L 67/56* (2022.05)

(58) Field of Classification Search
CPC ........ H04L 41/14; H04L 63/123; H04L 67/56
(Continued)

(56) References Cited

U.S. PATENT DOCUMENTS

| | | | |
|---|---|---|---|
| 8,412,806 B2 * | 4/2013 | Schneider | H04L 12/6418 709/225 |
| 2013/0086432 A1 * | 4/2013 | Bauer | H04J 3/0688 714/47.3 |

(Continued)

FOREIGN PATENT DOCUMENTS

| | | | | |
|---|---|---|---|---|
| CN | 105373111 A * | 3/2016 | | G08C 25/00 |
| WO | WO-2013009284 A1 * | 1/2013 | | H04W 4/80 |

(Continued)

OTHER PUBLICATIONS

"3rd Generation Partnership Project; Technical Specification Group Core Network and Terminals; 5G System; Technical Realization of Service Based Architecture; Stage 3 (Release 18)", 3GPP TS 29.500, V18.5.0, pp. 1-150 (Mar. 2024).

(Continued)

*Primary Examiner* — Hamza N Algibhah
(74) *Attorney, Agent, or Firm* — Jenkins, Taylor & Hunt, P.A.

(57) ABSTRACT

A method for checking end-to-end SBI message integrity includes receiving a first traffic feed from a first NF, the first traffic feed including copies of SBI messages transmitted from the first NF to an SCP. The method further includes receiving a second traffic feed from a second NF, the second traffic feed including copies of SBI messages received by the second NF from the SCP. The method further includes identifying, from the first traffic feed, a copy of a first SBI message transmitted by the first NF to the SCP. The method further includes identifying, from the second traffic feed, a copy of a second SBI message received by the second NF from the SCP and that is associated with the copy of the first SBI message. The method further includes performing, using the message copies, an end-to-end SBI message integrity check for the first SBI message.

20 Claims, 7 Drawing Sheets

(51) Int. Cl.
  *H04L 9/40* (2022.01)
  *H04L 29/06* (2006.01)
  *H04L 41/14* (2022.01)
  *H04L 67/56* (2022.01)
(58) Field of Classification Search
  USPC .......................................................... 709/224
  See application file for complete search history.

(56) References Cited

U.S. PATENT DOCUMENTS

| | | | | |
|---|---|---|---|---|
| 2016/0294657 | A1* | 10/2016 | Qiu | H04L 67/14 |
| 2022/0360447 | A1* | 11/2022 | Rajput | H04L 9/3247 |
| 2022/0360953 | A1* | 11/2022 | Gundavelli | H04L 51/48 |
| 2022/0360989 | A1* | 11/2022 | Rajput | H04W 12/06 |
| 2022/0417073 | A1* | 12/2022 | Newman | H04L 1/0019 |
| 2023/0019000 | A1* | 1/2023 | Li | H04W 12/08 |
| 2023/0072290 | A1* | 3/2023 | Rajput | H04L 63/102 |
| 2023/0319571 | A1* | 10/2023 | Jost | H04L 67/56 |
| | | | | 455/410 |
| 2023/0353657 | A1* | 11/2023 | Krishan | H04L 45/74 |
| 2025/0133095 | A1* | 4/2025 | Rajput | H04L 63/1483 |

FOREIGN PATENT DOCUMENTS

| | | | | | |
|---|---|---|---|---|---|
| WO | WO-2016114842 | A1 * | 7/2016 | ......... | H04L 63/0478 |
| WO | WO-2021240055 | A1 * | 12/2021 | ........... | H04L 67/562 |
| WO | WO-2022043130 | A1 * | 3/2022 | ............. | H04L 67/56 |
| WO | WO-2022233497 | A1 * | 11/2022 | ........... | H04L 63/205 |
| WO | WO-2025034237 | A1 * | 2/2025 | ........... | H04L 9/0891 |

OTHER PUBLICATIONS

"3rd Generation Partnership Project; Technical Specification Group Core Network and Terminals; 5G System; Network Function Repository Services; Stage 3 (Release 18)", 3GPP TS 29.510, V18.6.0, pp. 1-412 (Mar. 2024).

"3$^{rd}$ Generation Partnership Project; Technical Specification Group Services and System Aspects; Security architecture and procedures for 5G system (Release 18)", 3GPP TS 33.501, V18.5.0, pp. 1-330 (Mar. 2024).

"Oracle Communications Network Analytics Data Director," Oracle, Version 1.0, pp. 1-6 (2022).

"Confidentiality, Integrity, and Availability: The CIA Triad," Office of Information Security, Washington University in St. Louis (2024).

* cited by examiner

METHODS, SYSTEMS, AND COMPUTER READABLE MEDIA FOR PROVIDING END-TO-END MESSAGE INTEGRITY CHECKING FOR SERVICE-BASED INTERFACE (SBI) MESSAGES COMMUNICATED VIA A SERVICE COMMUNICATION PROXY (SCP)

TECHNICAL FIELD

The subject matter described herein relates to testing message integrity in a communication network. More particularly, the subject matter described herein relates to methods, systems, and computer readable media for providing end-to-end message integrity checking for SBI messages communicated via an SCP.

BACKGROUND

In 5G telecommunications networks, a network function that provides service is referred to as a producer NF or service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides one or more services. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the types of services provided by an NF instance as well as contact and capacity information regarding the NF instance.

SCPs route messages between producer NF instances. An SCP can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

One problem that can occur in 5G and subsequent generation networks is that SBI messages that traverse an SCP may be modified by a hacker that has gained access to the SCP. The modified messages can be used to initiate a security attack, for example, to disrupt network communications. When two NFs connect to an SCP, each NF establishes a transport layer security (TLS) connection with the SCP, and there is an inherent trusted relationship between each NF and the SCP for messages received over the TLS connections. If the SCP is compromised by a hacker, the hacker can modify messages transmitted to the NFs, and the NFs will not be aware of the modification because there is no end-to-end message integrity check to ensure that the SBI messages transmitted to the other NF via the SCP are not altered by the SCP.

Accordingly, in light of these and other difficulties, there exists a need for improved security for SBI messages transmitted between NFs via an SCP.

SUMMARY

A method for checking end-to-end SBI message integrity using a network analytics platform includes receiving, by a network analytics platform, a first traffic feed from a first NF, the first traffic feed including copies of SBI messages transmitted from the first NF to an SCP. The method further includes receiving, by the network analytics platform, a second traffic feed from a second NF, the second traffic feed including copies of SBI messages received by the second NF from the SCP. The method further includes identifying, by the network analytics platform and from the first traffic feed, a copy of a first SBI message transmitted by the first NF to the SCP. The method further includes identifying, by the network analytics platform and from the second traffic feed, a copy of a second SBI message received by the second NF from the SCP and that is associated with the copy of the first SBI message. The method further includes performing, by the network analytics platform and using the copy of the first SBI message transmitted by the first NF to the SCP and the copy of the second SBI message received by the second NF from the SCP, an end-to-end SBI message integrity check for the first SBI message. The method further includes performing, by the network analytics platform and based on results of the end-to-end SBI message integrity check, a network security action.

According to another aspect of the subject matter described herein, identifying the copy of the first SBI message transmitted by the first NF to the SCP includes identifying a copy of an SBI request message transmitted by the first NF.

According to another aspect of the subject matter described herein, identifying the copy of the second SBI message received by the second NF from the SCP includes identifying a copy of an SBI request message received by the second NF.

According to another aspect of the subject matter described herein, identifying the copy of the first SBI message transmitted by the first NF to the SCP includes identifying a copy of an SBI response message.

According to another aspect of the subject matter described herein, identifying the copy of the second SBI message received by the second NF includes identifying a copy of an SBI response message received by the second NF.

According to another aspect of the subject matter described herein, identifying the copy of the second SBI message that is associated with the copy of the first SBI message includes reading a correlation ID from the copy of the first SBI message and using the correlation ID to locate the copy of the second SBI message in an end-to-end SBI message integrity checking database maintained by the network analytics platform.

According to another aspect of the subject matter described herein, performing the end-to-end SBI message integrity check includes comparing message attribute values in the copy of the first SBI message with message attribute values in the copy of the second SBI message and determining that one or more of the message attribute values in the copy of the first SBI message do not match one or more of the message attribute values in the copy of the second SBI message.

According to another aspect of the subject matter described herein, performing the network security action includes generating an indication of failure of the end-to-end SBI message integrity check and communicating the indication of failure of the end-to-end SBI message integrity check to a network operator.

According to another aspect of the subject matter described herein, performing the end-to-end SBI message integrity check comprises including, in the comparing, message attribute values that should not be modified during Third Generation Partnership Project (3GPP)-defined operation of the SCP.

According to another aspect of the subject matter described herein, performing the end-to-end SBI message integrity check comprises excluding, from the comparing, message attribute values that are modified by the SCP during Third Generation Partnership Project (3GPP)-defined operation of the SCP.

According to another aspect of the subject matter described herein, a system for checking end-to-end SBI message integrity using a network analytics platform is provided. The system includes a network analytics platform including at least one processor and a memory. The system further includes an end-to-end SBI message integrity checker implemented by the at least one processor for receiving a first traffic feed from a first NF, the first traffic feed including copies of SBI messages transmitted from the first NF to an SCP, receiving a second traffic feed from a second NF, the second traffic feed including copies of SBI messages received by the second NF from the SCP, identifying, from the first traffic feed, a copy of a first SBI message transmitted by the first NF to the SCP, identifying, from the second traffic feed, a copy of a second SBI message received by the second NF from the SCP and that is associated with the copy of the first SBI message, performing, using the copy of the first SBI message transmitted by the first NF to the SCP and the copy of the second SBI message received by the second NF from the SCP, an end-to-end SBI message integrity check for the first SBI message, and performing, by the network analytics platform and based on results of the end-to-end SBI message integrity check, a network security action.

According to another aspect of the subject matter described herein, the copy of the first SBI message transmitted by the first NF to the SCP comprises a copy of an SBI request message transmitted by the first NF.

According to another aspect of the subject matter described herein, the copy of the second SBI message received by the second NF from the SCP comprises a copy of an SBI request message received by the second NF.

According to another aspect of the subject matter described herein, the copy of the first SBI message transmitted by the first NF to the SCP comprises a copy of an SBI response message transmitted by the first NF.

According to another aspect of the subject matter described herein, the copy of the second SBI message received by the second NF from the SCP comprises a copy of an SBI response message received by the second NF.

According to another aspect of the subject matter described herein, the end-to-end SBI message integrity checker is configured to identify the copy of the second SBI message that is associated with the copy of the first SBI message by reading a correlation ID from the copy of the first SBI message and using the correlation ID to locate the copy of the second SBI message in an end-to-end SBI message integrity checking database maintained by the network analytics platform.

According to another aspect of the subject matter described herein, the end-to-end SBI message integrity checker is configured to perform the end-to-end SBI message integrity check by comparing message attribute values in the copy of the first SBI message with message attribute values in the copy of the second SBI message and determining that one or more of the message attribute values in the copy of the first SBI message do not match one or more of the message attribute values in the copy of the second SBI message.

According to another aspect of the subject matter described herein, the end-to-end SBI message integrity checker is configured to perform the network security action by generating an indication of failure of the end-to-end SBI message integrity check and communicate the indication of failure of the end-to-end SBI message integrity check to a network operator.

According to another aspect of the subject matter described herein, the end-to-end SBI message integrity checker is configured to perform the end-to-end SBI message integrity check by including, in the comparing, message attribute values that should not be modified during Third Generation Partnership Project (3GPP)-defined operation of the SCP and excluding, from the comparing, message attribute values that are modified by the SCP during 3GPP-defined operation of the SCP.

According to another aspect of the subject matter described herein, a non-transitory computer readable medium having stored thereon executable instructions that when executed by a processor of a computer control the computer to perform steps is provided. The steps include receiving, by a network analytics platform, a first traffic feed from a first NF, the first traffic feed including copies of SBI messages transmitted from the first NF to an SCP. The steps further include receiving, by the network analytics platform, a second traffic feed from a second NF, the second traffic feed including copies of SBI messages received by the second NF from the SCP. The steps further include identifying, by the network analytics platform and from the first traffic feed, a copy of a first SBI message transmitted by the first NF to the SCP. The steps further include identifying, by the network analytics platform and from the second traffic feed, a copy of a second SBI message received by the second NF from the SCP and that is associated with the copy of the first SBI message. The steps further include performing, by the network analytics platform and using the copy of the first SBI message transmitted by the first NF to the SCP and the copy of the second SBI message received by the second NF from the SCP, an end-to-end SBI message integrity check for the first SBI message. The steps further include performing, by the network analytics platform and based on results of the end-to-end SBI message integrity check, a network security action.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
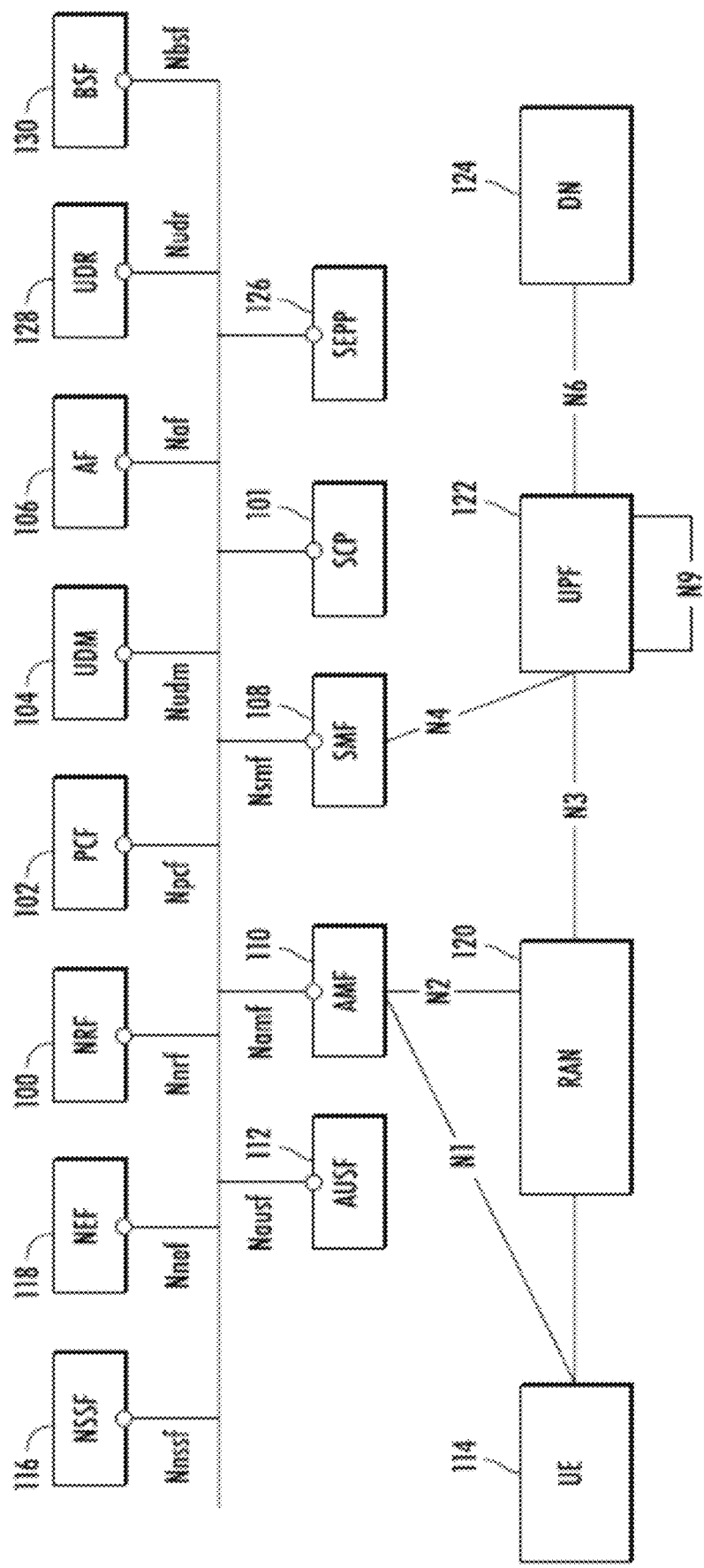
FIG. 1 is a network diagram illustrating an exemplary 5G system network architecture.

FIG. 1 is a network diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. To communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the types of services provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 provides authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

A SEPP 126 filters incoming traffic from another PLMN and can perform topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN. A SEPP filtering egress messages from consumer NFs in a PLMN is referred to as a consumer SEPP or C-SEPP. A SEPP that filters ingress messages directed to consumer NFs in a PLMN is referred to as a producer SEPP or P-SEPP. A given SEPP can function as a C-SEPP and a P-SEPP, depending on the role the SEPP is performing.

A unified data repository (UDR) 128 stores subscription data for UEs. A binding support function (BSF) 130 manages bindings between PDU sessions and PCFs.

As described above, one problem that can occur in 5G and subsequent generation networks is that a hacker can compromise an SCP and modify, for malicious purposes, SBI messages transmitted via the SCP. For example, a hacker may use modified messages to initiate a security attack that disrupts network communications. The Third Generation Partnership Project (3GPP)-defined 5G core (5GC) network provides no mechanism for end-to-end message integrity, as transport layer security (TLS) connections used by NFs are hop-to-hop. If the SCP is compromised, a hacker can modify messages for malicious purposes, and the modification will not be detected by the originating and terminating NFs.

The 3GPP-defined 5G core network involves SBI messages traversing multiple NFs. An NF service consumer sends SBI messages to an NF service producer, and the messages may traverse a proxy, such as an SCP. If the SCP is compromised by a hacker, the SBI message integrity can be compromised without the NF service producer being aware of the modifications to the message. The inherent trust between the SCP and the NF service producer based on TLS level security does not mitigate attacks where the SCP itself is compromised. In such attacks, a hacker can choose to tamper with the message or even replay the message for the hacker's advantage. In one example attack: a hacker can modify the subscriber ID in the UDM SDM GET API to get details of a high profile subscriber. The message integrity attacks can be performed on both SBI requests and responses.

The subject matter described herein mitigates such attacks using a network analytics platform that receives message copy feeds from consumer NFs and producer NFs. The network analytics platform correlates SBI messages transmitted by the consumer NF to the SCP with SBI messages received by the producer NF (in the case of requests) or SBI messages transmitted by the producer NF to the SCP with SBI messages received by the consumer NF (in the case of responses). The network analytics platform compares the transmitted and received SBI messages for integrity violations. One way to perform the message integrity check is by computing a hash of message attribute values of interest and comparing the hash values. Another way to perform the message integrity check is to compare the message attribute values of interest directly without computing a hash. Message attributes that are modified by the SCP in its normal (3GPP-defined) operation may be excluded from the comparison. If the hashes match, no integrity violation is found. If the hashes do not match, the network analytics platform may determine that a message integrity violation has occurred and may perform a network security action, such as communicating an indication of the message integrity check failure to a network operator. The integrity check performed by the network analytics platform may be passive in nature, so that the check does not interfere with SBI communications or mitigate the attack in real time, but rather informs the network operator of a potentially compromised SCP. Using this information, the network operator can prevent future attacks by taking the compromised SCP out of service and removing the hacker code that compromised the operations of the SCP.

Figure 2:
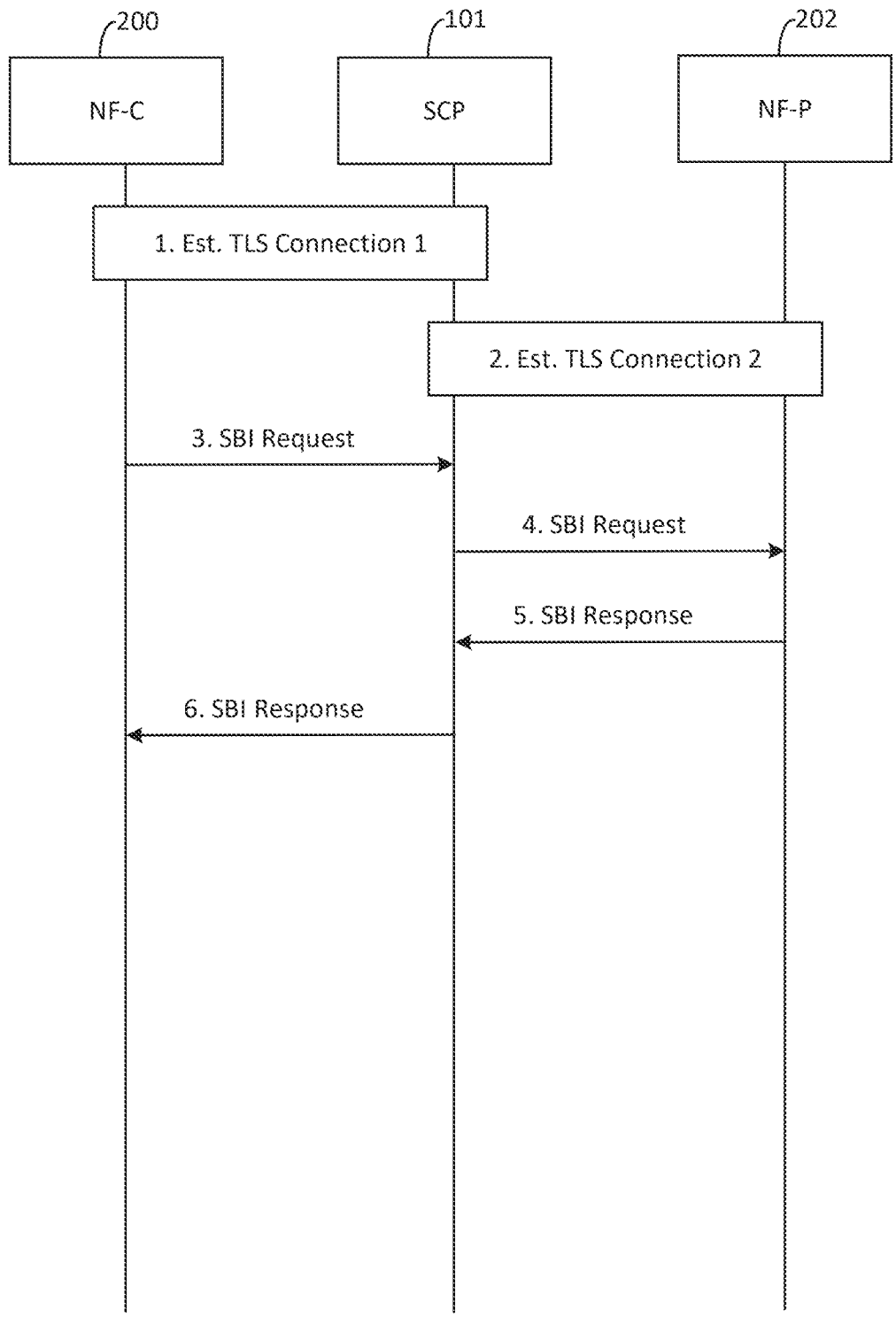
FIG. 2 is a message flow diagram illustrating 5G indirect communication via an SCP.

FIG. 2 is a message flow diagram illustrating 5G indirect communication via an SCP. Referring to FIG. 2, an NF service consumer 200 communicates with an NF service producer 202 via an SCP 101. In step 1, NF service consumer 200 and SCP 101 establish a first TLS connection for SBI communications between NF service consumer 200 and SCP 101. In step 2, SCP 101 and NF service producer 202 establish a second TLS connection for SBI message communication between SCP 101 and NF service producer 202. The TLS connections are point-to-point and are terminated at SCP 101. Because SCP 101 is a trusted endpoint of both TLS connections, there is no end-to-end integrity checking of SBI messages transmitted between NF service consumer 200 and NF service producer 202 via SCP 101. In step 3, NF service consumer sends an SBI request to SCP 101. In step 4, SCP 101 sends the SBI request to NF service producer 202. In step 5, NF service producer 202 generates an SBI response and sends the SBI response to SCP 101. In step 6, SCP 101 sends the SBI response to NF service consumer 200. Because the SCP is a trusted endpoint to both NF service consumer 200 and NF service producer 202, the SBI request and the SBI response are vulnerable to hacker code at the SCP.

Figure 3:
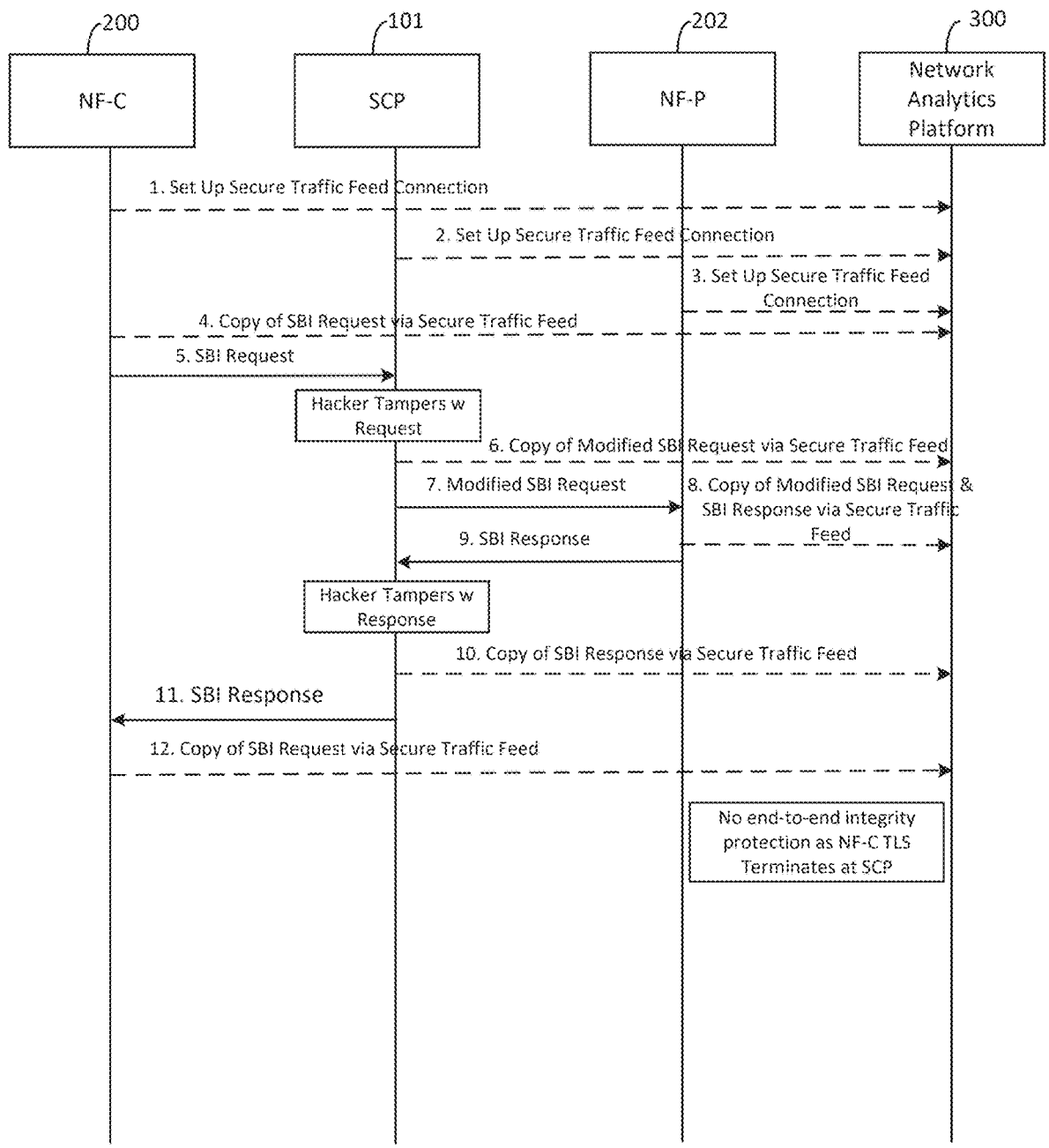
FIG. 3 is a message flow diagram illustrating a problem that can occur in 5G indirect communication via an SCP when the SCP is compromised by a hacker.

FIG. 3 is a message flow diagram illustrating a problem that can occur in 5G indirect communication via an SCP when the SCP is compromised by a hacker. Referring to FIG. 3, in steps 1-3, NF service consumer 200, SCP 101, and NF service producer 202 establish secure connections with a network analytics platform 300. The purpose of these connections is for the NFs and the SCP to send copies of messages to network analytics platform 300, which aggregates the message copies and provides the message copies to downstream applications. After step 3, SCP 101 is compromised by a hacker. By "compromised", it is meant that SCP 101 is modified to include hacker code that causes SCP 101 to modify SBI messages for malicious purposes, such as data theft or disruption of network communications.

In step 4, NF service consumer 200 generates and SBI request message to be sent to NF service producer 202 and sends a copy of the SBI request message to network analytics platform 300 as part of the traffic feed to network analytics platform 300. As stated above, the purpose of this traffic feed is for network analytics platform 300 to distribute the traffic to downstream applications, which do not currently include end-to-end message integrity testing.

In step 5, NF service consumer 200 sends an SBI request message to SCP 101. In step 6, SCP 101 sends a copy of the SBI request message to network analytics platform 300 as part of its traffic feed of copied messages to network analytics platform 300. The hacker code running on SCP 101 tampers with the request message by modifying one or more message attribute values. In step 7, SCP 101 sends the modified SBI request message to NF service producer 202. The modified SBI request message causes NF service producer 202 to insert incorrect data in the SBI. In step 8, NF service producer 202 sends a copy of the SBI request and the SBI response to network analytics platform 300 as part of its traffic feed to network analytics platform 300. In step 9, NF service producer 202 sends the SBI response to SCP 101. The hacker code running on SCP 101 may tamper with the response in an attempt to further disrupt communications. In step 10, SCP 101 sends a copy of the response to network analytics platform 300 as part of its traffic feed to network analytics platform 300. In step 11, SCP 101 forwards the SBI response message to NF service consumer 200. In step 12, NF service consumer 200 sends a copy of the SBI response message to network analytics platform 300 as part of its traffic feed to network analytics platform 300. Thus, in FIG. 3, because there is no end-to-end message integrity check of messages that traverse SCP 101, a hacker that compromises the SCP can modify messages without detection by the message endpoints.

To mitigate attack scenarios caused by compromised SCPs, the network analytics platform may perform message comparisons between SBI message copies received from source and destination NFs to check for any tampering. The network analytics platform provides an authentication/authorization service for its traffic feeds, which allows only legitimate/allowed 5G NFs and proxies to send message copies to the network analytics platform. In one example, the network analytics platform allows the NFs and proxies to establish secure TLS connections over which the NF and proxies send copies of SBI messages (requests and responses) to the network analytics platform.

To allow correlation of messages transmitted by one endpoint (consumer NF or producer NF) with messages received by the other endpoint (producer NF or consumer NF), a message correlation ID will be generated. The message correlation ID is generated by the transmitting endpoint and forwarded in SBI requests and responses as one of the message headers. The receiving endpoint may read the message correlation ID in the incoming SBI message and include the message correlation ID in the copy of the received SBI message transmitted to the network analytics platform. The network analytics platform may use the message correlation ID in a message copy to determine whether a corresponding message copy has been received in the message feed from the other endpoint. The message correlation ID may be a universally unique identifier (UUID). The name and format of the header used to carry the correlation ID may be agreed upon by the endpoints. Proxies, such as SCPs, that receive messages with this header may be configured to propagate the header without modifying the header in forwarded SBI requests or responses.

Figure 4:
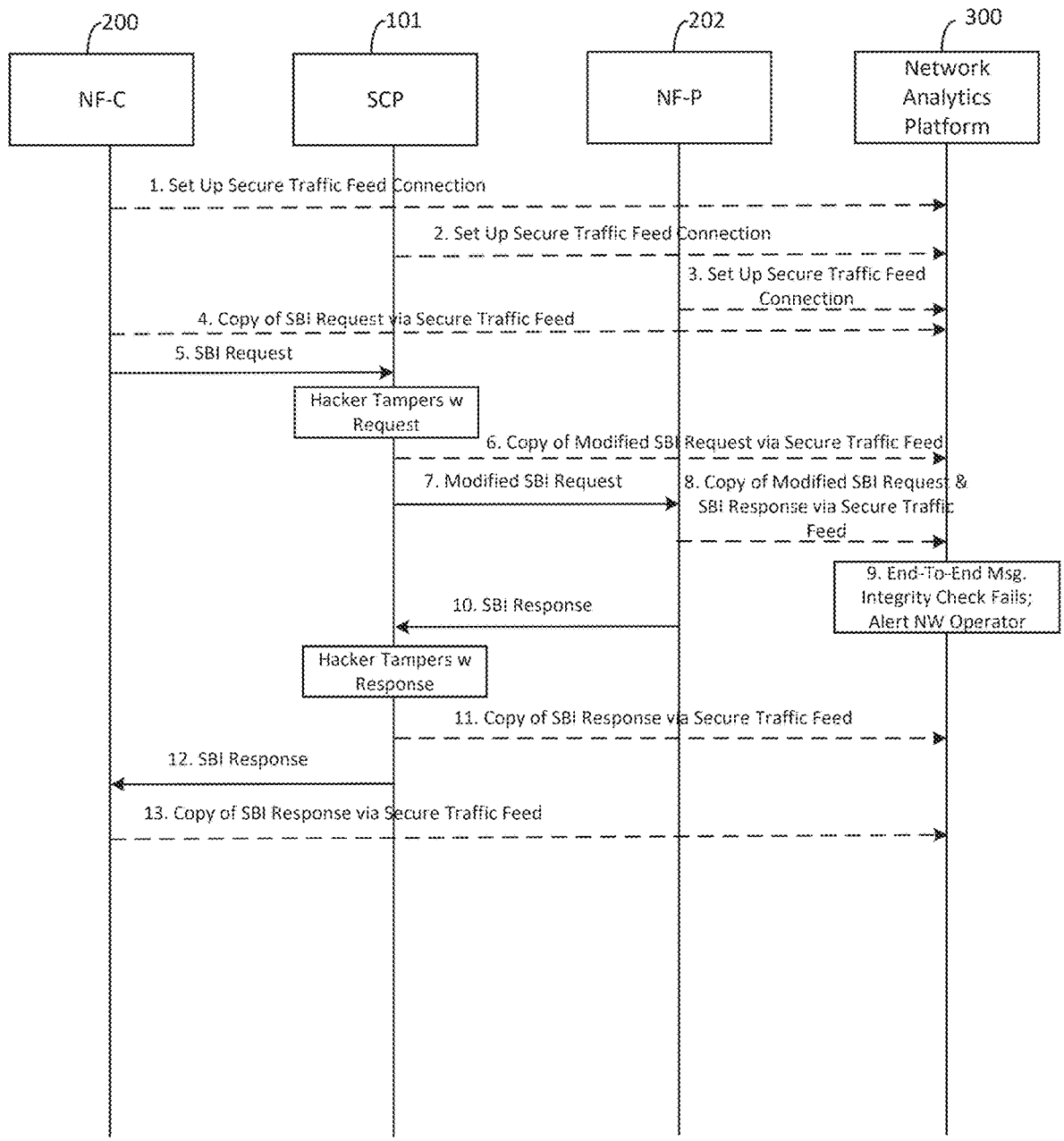
FIG. 4 is a message flow diagram illustrating end-to-end message integrity checking of an SBI request message by a network analytics platform for 5G indirect communication via an SCP.

FIG. 4 is a message flow diagram illustrating end-to-end message integrity checking of an SBI request message by a network analytics platform for 5G indirect communication via an SCP. Referring to FIG. 4, in steps 1-3, NF service consumer 200, SCP 101, and NF service producer 202 establish secure connections with network analytics platform 300. The purpose of these connections is for the NFs and SCP to send copies of messages to network analytics platform 300, which aggregates the messages and provides them to downstream applications. In addition, these connections may be used to receive copies of messages transmitted by one communication endpoint and receive copies of corresponding messages received by the other endpoint for purposes of performing end-to-end message integrity checks. After step 3, SCP 101 is compromised by a hacker to include hacker code that causes SCP 101 to modify SBI request and response messages for malicious purposes.

In step 4, NF service consumer 200 generates an SBI request message to be sent to NF service producer 202 and sends a copy of the SBI request message to network analytics platform 300 as part of the traffic feed to network analytics platform 300. In this case, unlike the example in FIG. 3, one purpose of sending the copy of the message to network analytics platform 300 is for performing end-to-end message integrity testing. NF service consumer 200 generates a correlation ID for the SBI request message and sends the correlation ID with the copy of the SBI request message transmitted to network analytics platform 300. Network analytics platform 300 may receive the message copy, read the correlation ID, and determine that another message with the same correlation ID has not yet been received. Accordingly, network analytics platform 300 may cache or store the message copy along with the correlation ID in an end-to-end message integrity checking database.

In step 5, NF service consumer 200 sends an SBI request to SCP 101. NF service consumer 200 includes the correlation ID in a header of the SBI request message transmitted to SCP 101. In step 6, SCP 101 sends a copy of the SBI request message to network analytics platform 300 as part of its traffic feed of copied messages to network analytics platform 300. The hacker code running on SCP 101 tampers with the SBI request message by modifying one or more message attribute values. In step 7, SCP 101 sends the modified SBI request to NF service producer 202. The modified SBI request causes NF service producer 202 to insert incorrect data in the SBI response message. In step 8, NF service producer 202 sends copies of the SBI request and response messages to network analytics platform 300 as part of its traffic feed to network analytics platform 300. In each of the request and response message copies, NF service producer 202 inserts a correlation ID (or maintains the existing correlation ID) in the message prior to transmitting the message copy to network analytics platform 300. For the SBI request message copy, NF service producer 202 may simply maintain the existing correlation ID from the SBI request in the message copy by including a copy of the message header carrying the correlation ID in the message copy transmitted to network analytics platform 300. For the SBI response message copy, the correlation ID is a unique value generated by NF service producer 202.

Network analytics platform 300 receives the message copies, reads the correlation IDs from the message copies, and determines that the correlation ID for the SBI request message copy in step 8 matches the correlation ID from the SBI request message copy received in step 4. In step 9, network analytics platform 300 performs an end-to-end message integrity check for the SBI request message transmitted in step 5 by comparing predetermined attribute values in the message copies. Examples of message attribute values that are compared and examples of message attribute values that are excluded from comparison will be described below. In this case, because the message copy received by network analytics platform 300 in step 8 includes message attribute values that were modified by the hacker code, the message attribute values will not match those of the SBI request message copy received by network analytics platform 300 in step 4. As a result, the end-to-end message integrity check fails, and network analytics platform 300 performs a network security action, such as sending an alert message with details of the modified message attribute values to a network operator. For the SBI response message copy, network analytics platform 300 may store the message and its correlation ID in the end-to-end message integrity checking database because a corresponding SBI response message copy with the same correlation ID has not yet been received by network analytics platform 300.

In step 10, NF service producer 202 sends the SBI response to SCP 101. After SCP 101 receives the response, the hacker code running on SCP 101 tampers with the response. In step 11, SCP 101 sends a copy of the response to network analytics platform 300 as part of its traffic feed to network analytics platform 300. In step 12, SCP 101 forwards the SBI response to NF service consumer 200. In step 13, NF service consumer 200 sends a copy of the response to network analytics platform 300 as part of its traffic feed to network analytics platform 300. As will be described in more detail below, network analytics platform 300 may also perform an end-to-end message integrity check for the SBI response message transmitted in step 10. However, in the example illustrated in FIG. 4, the end-to-end integrity check is performed for an SBI request message, a message integrity violation is detected, and a network operator is alerted. The network operator can then take appropriate action, such as taking the SCP out of service, removing the hacker code, and placing the SCP back into service after the hacker code is removed.

Figure 5:
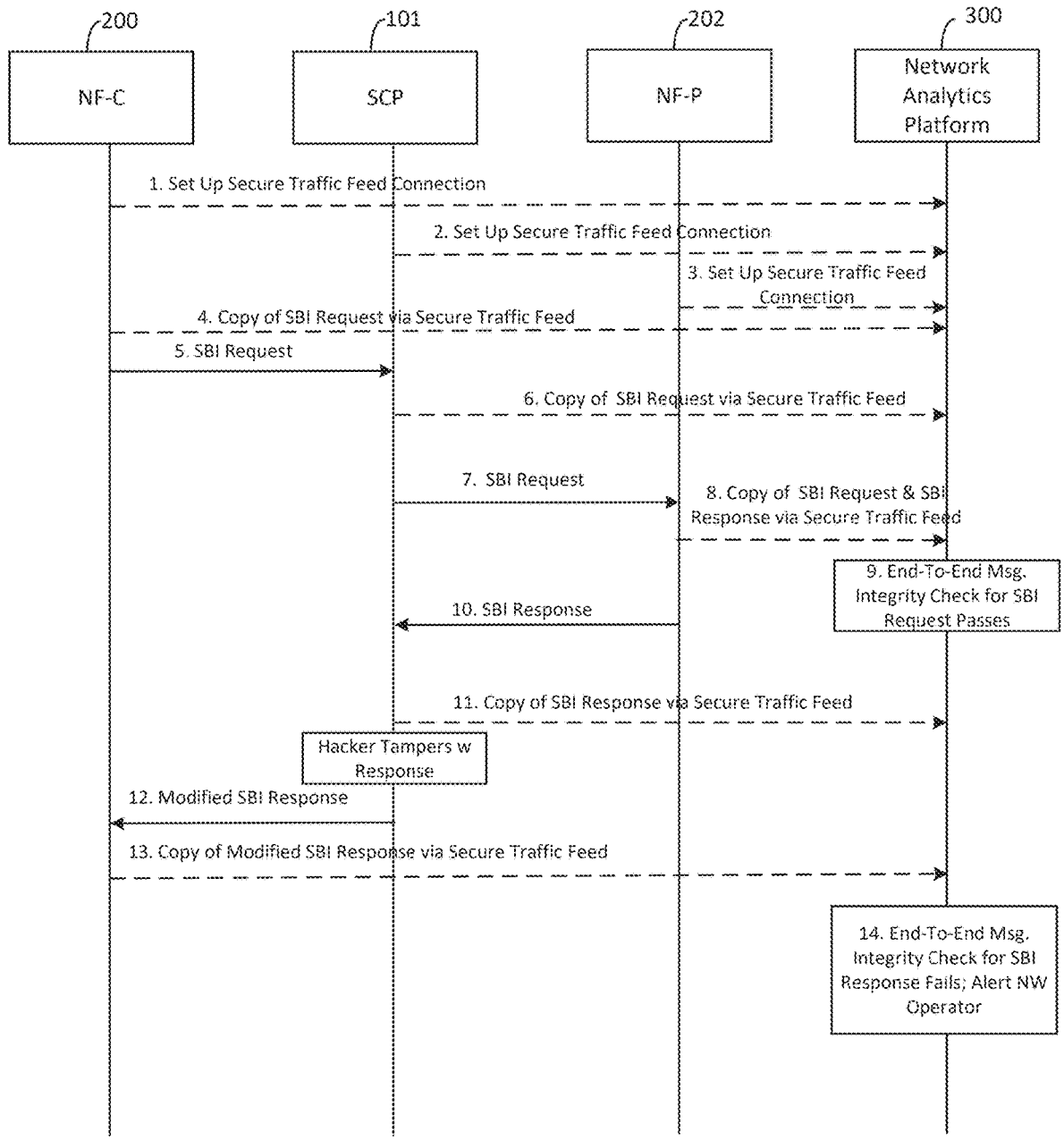
FIG. 5 is a message flow diagram illustrating end-to-end message integrity checking of an SBI response message by a network analytics platform for 5G indirect communication via an SCP.

The subject matter described herein is not limited to performing end-to-end integrity checks for SBI request messages. In addition to performing end-to-end message integrity checks for SBI request messages, network analytics platform 300 may perform end-to-end message integrity checks for SBI response messages. FIG. 5 is a message flow diagram illustrating an integrity check performed for SBI response messages. Referring to FIG. 5, in steps 1-3, NF service consumer 200, SCP 101, and NF service producer 202 establish secure connections with network analytics platform 300 for sending traffic feeds to network analytics platform 300. After step 3, SCP 101 is compromised by a hacker to include hacker code that causes SCP 101 to modify SBI response messages for malicious purposes, for example, to disrupt SBI transactions in the network by sending false data to the NF service consumers in the response messages.

In step 4, NF service consumer 200 generates an SBI request message to be sent to NF service producer 202 and sends a copy of the SBI request message to network analytics platform 300 as part of the traffic feed to network analytics platform 300. NF service consumer 200 generates a correlation ID for the SBI request message and sends the correlation ID with the copy of the SBI request message transmitted to network analytics platform 300. Network analytics platform 300 may receive the message copy, read the correlation ID, and determine that another message with the correlation ID has not yet been received. Accordingly, network analytics platform 300 may cache or store the message copy along with the correlation ID in an end-to-end message integrity checking database. In step 5, NF service consumer 200 sends the SBI request to SCP 101. NF service consumer 200 includes the correlation ID in a header of the SBI request message transmitted to SCP 101.

In step 6, SCP 101 sends a copy of the SBI request message to network analytics platform 300 as part of its traffic feed of copied messages to network analytics platform 300. In this case, the hacker code running on SCP 101 does not modify the request because the hacker code is designed to modify SBI responses. In step 7, SCP 101 sends the SBI request to NF service producer 202. In step 8, NF service producer 202 generates an SBI response and sends copies of the SBI request and response messages to network analytics platform 300 as part of its traffic feed to network analytics platform 300. In each of the request and response message copies, NF service producer 202 inserts a correlation ID (or keeps the existing correlation ID) in the message copy prior to transmitting the message copy to network analytics platform 300. For the SBI request message copy, the correlation ID is the same as the correlation ID generated by the NF service consumer 200 in step 4. For the SBI response message copy, network analytics platform 300 may generate the correlation ID and add the correlation ID to the response message copy.

Network analytics platform 300 receives the message copies and reads the correlation IDs from the message copies. Network analytics platform 300 determines that the correlation ID from the SBI request message copy received in step 8 matches the correlation ID in the SBI request message copy received in step 4. For the SBI response message copy, network analytics platform 300 determines that the correlation ID does not match the correlation ID of a previously received message, and network analytics platform 300 stores the SBI response message copy along with its correlation ID in the end-to-end message integrity checking database. In step 9, network analytics platform 300 performs an end-to-end message integrity check for the SBI request message copies with matching correlation IDs by comparing predetermined attribute values in the SBI request message copies. In this case, because the SBI request message copy received by network analytics platform 300 in step 8 was not modified by the hacker code, the message attribute values match those of the SBI request message copy received by network analytics platform 300 in step 4. As a result, the end-to-end message integrity check for the SBI request message transmitted in step 5 passes, and network analytics platform 300 may perform a network security action responsive to the passing of the end-to-end message integrity check, such as storing, in the SBI message integrity checking database, an indication of the successful end-to-end SBI message integrity check.

In step 10, NF service producer 202 sends the SBI response to SCP 101. NF service producer 202 inserts the correlation ID that NF service producer 202 generated for the SBI response message in a predetermined header of the SBI response message. SCP 101 receives the response, and, in step 11, sends a copy of the response to network analytics platform 300.

Hacker code running on SCP 101 modifies the response by replacing one or more message attribute values in the message with values supplied by the hacker code, e.g., for the purpose of disrupting or delaying SBI transactions. In step 12, SCP 101 forwards the modified SBI response to NF service consumer 200. In step 13, NF service consumer 200 sends a copy of the modified SBI response to network analytics platform 300 as part of its traffic feed to network analytics platform 300. NF service consumer 200 may include the correlation ID from the response message in the response message copy transmitted to network analytics platform 300.

Network analytics platform 300 receives the SBI response message copy transmitted in step 13, reads the correlation ID from the SBI response message copy, and determines that a response message copy with a matching correlation ID is present in the end-to-end SBI message integrity checking database. Accordingly, network analytics platform 300 performs an end-to-end message integrity check for the SBI response message transmitted in step 10 by comparing predetermined message attribute values of the SBI response message copy received in step 13 with corresponding message attribute values of the SBI response message copy received in step 8. In this case, the end-to-end message integrity check fails because the hacker code modified the SBI response message before transmitting the SBI response message to NF service consumer 200 in step 12. Accordingly, network analytics platform 300 may perform a network security action, such as generating an alert indicating failure of the end-to-end message integrity check for the SBI response message and transmitting the alert to the network operator. Thus, in FIG. 5, the end-to-end integrity check is performed for an SBI response message, a message integrity violation is detected, and a network operator is alerted. The network operator can then take appropriate action, such as taking the SCP out of service, removing the hacker code, and placing the SCP back into service after the hacker code is removed.

Figure 6:
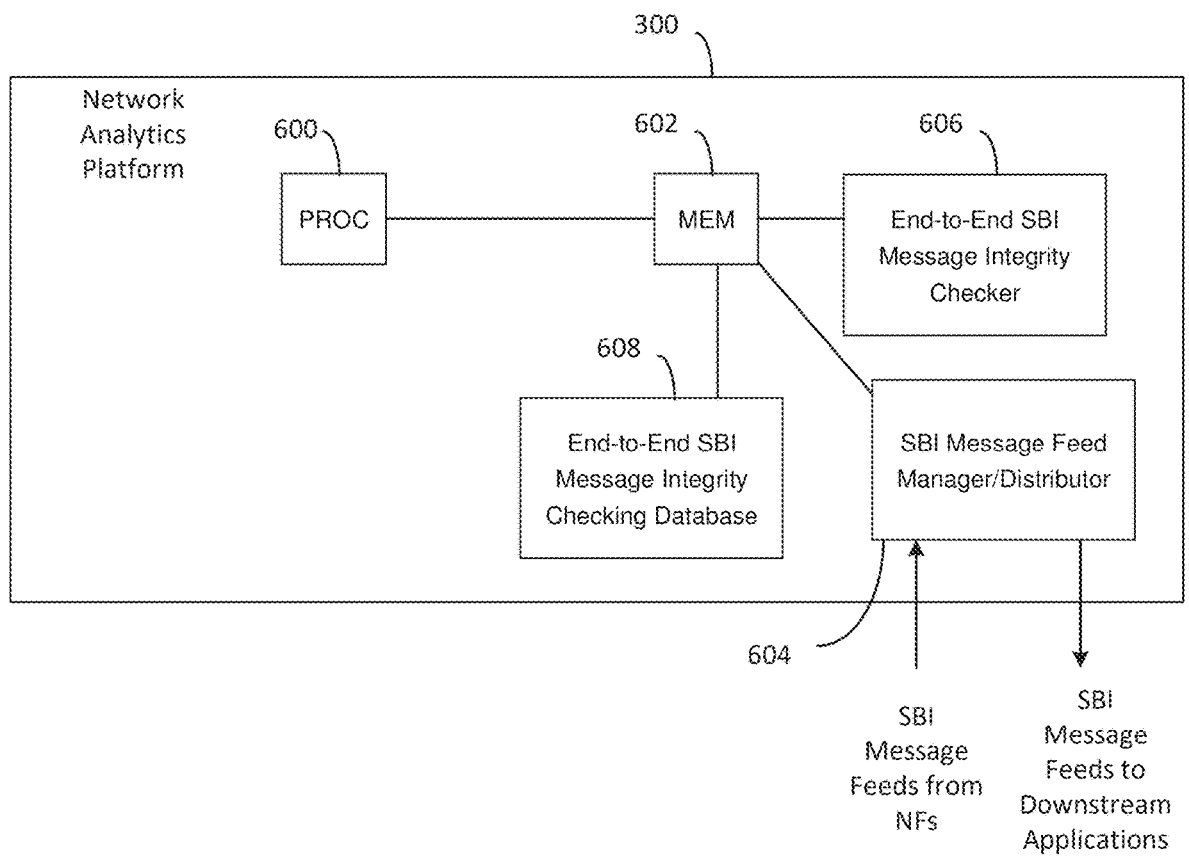
FIG. 6 is a block diagram of a network analytics platform suitable for performing the end-to-end SBI message integrity checking described herein.

FIG. 6 is a block diagram illustrating an exemplary architecture of network analytics platform 300. Referring to FIG. 6, network analytics platform 300 includes at least one processor 600 and memory 602. Network analytics platform 300 further includes an SBI message feed manager/distributor 604 that allows NFs to set up secure connections with network analytics platform 300, receives feeds of message copies over the connections, and distributes the feeds to downstream applications. Network analytics platform 300 further includes an end-to-end SBI message integrity checker 606 that performs the steps described herein for end-to-end SBI message integrity checking. Network analytics platform 300 further includes an end-to-end SBI message integrity checking database 608 that stores copies of messages for which end-to-end message integrity checking may be performed. End-to-end SBI message integrity checking database 608 may also store configuration options of network analytics platform 300, including specifications of the types of SBI messages for which end-to-end message integrity checking is performed and specifications of message parameter values to include and exclude from the end-to-end message integrity checks. End-to-end SBI message integrity checker 606 and SBI message feed manager/distributor 604 may be implemented using computer executable instructions stored in memory 602 and executed by processor 600. End-to-end SBI message integrity checking database 608 may be stored in memory 602.

One example of configuration options that may be stored in end-to-end SBI message integrity checking database 608 includes identifiers of the types of SBI messages for which end-to-end SBI message integrity checking is performed, names of the hypertext transfer protocol (HTTP) headers containing attribute values to be included and/or excluded from the SBI message integrity checking, and names of the JSON information elements (IEs) whose attribute values are to be included and/or excluded from the end-to-end SBI message integrity checking. In general, it is desirable to check message types that carry sensitive information or that can be used to trigger an NF to provide sensitive information. Examples of SBI request message types for which network analytics platform 300 may perform end-to-end SBI message integrity checking include request messages associated with N1 and N2 message transfer between the PCF and the AMF. This SBI request is used by the PCF to forward the UE switching and routing policies (URSP) to the UE via the AMF. Hacker code executing on the SCP may try to tamper with the USRP to adversely affect quality of service (QOS) provided to the UE or to further another goal of the hacker. Any SBI request message relating to network access or usage policies of an important user may also be targeted by hackers and should be checked for end-to-end SBI message integrity. Examples of SBI response messages for which network analytics platform 300 may be configured to perform end-to-end message integrity checks include any response to an SBI request message carrying an HTTP GET method, such as a response from a UDM to an SBI request message with an HTTP GET method. Examples of HTTP headers and JSON IEs that may be targeted for comparison in an end-to-end SBI message integrity check include:
HTTP Headers:
   3gpp-Sbi-Binding headers carrying resource binding.
   3gpp-sbi-origination-timestamp headers added by the NF service consumer originating the request.
   3gpp-Sbi-Callback headers carrying notification sender information.
JSON IEs:
   All JSON IEs that contain sensitive subscriber information.

In addition to defining message attribute values to include in end-to-end message integrity checking, it may be desirable to configure network analytics platform 300 to exclude certain attribute values from end-to-end SBI message integrity checking. For example, it may be desirable to exclude from end-to-end SBI message integrity checking message attribute values that are modified by SCPs during 3GPP-defined SCP operations. Examples of message attribute values that may be excluded from end-to-end message integrity checking are as follows:

Http Headers:
   3gpp-Sbi-Sender-Timestamp header carrying sender timestamp.
   3gpp-Sbi-Routing-Binding header carrying the routing binding information which will not be forwarded by the SCP.
   3gpp-Sbi-Access-Token header, as the access token may get renewed by the SCP in 3GPP communication model D (indirect routing with delegated discovery).
   3gpp-Sbi-Message-Priority header, as priority information carried by this header may get modified by SCP during its 3GPP-defined operation.
   Other headers which are not forwarded by the SCP.
JSON IES:
   Any JSON IEs that may be modified or added by an SCP during its 3GPP-defined operation.

Figure 7:
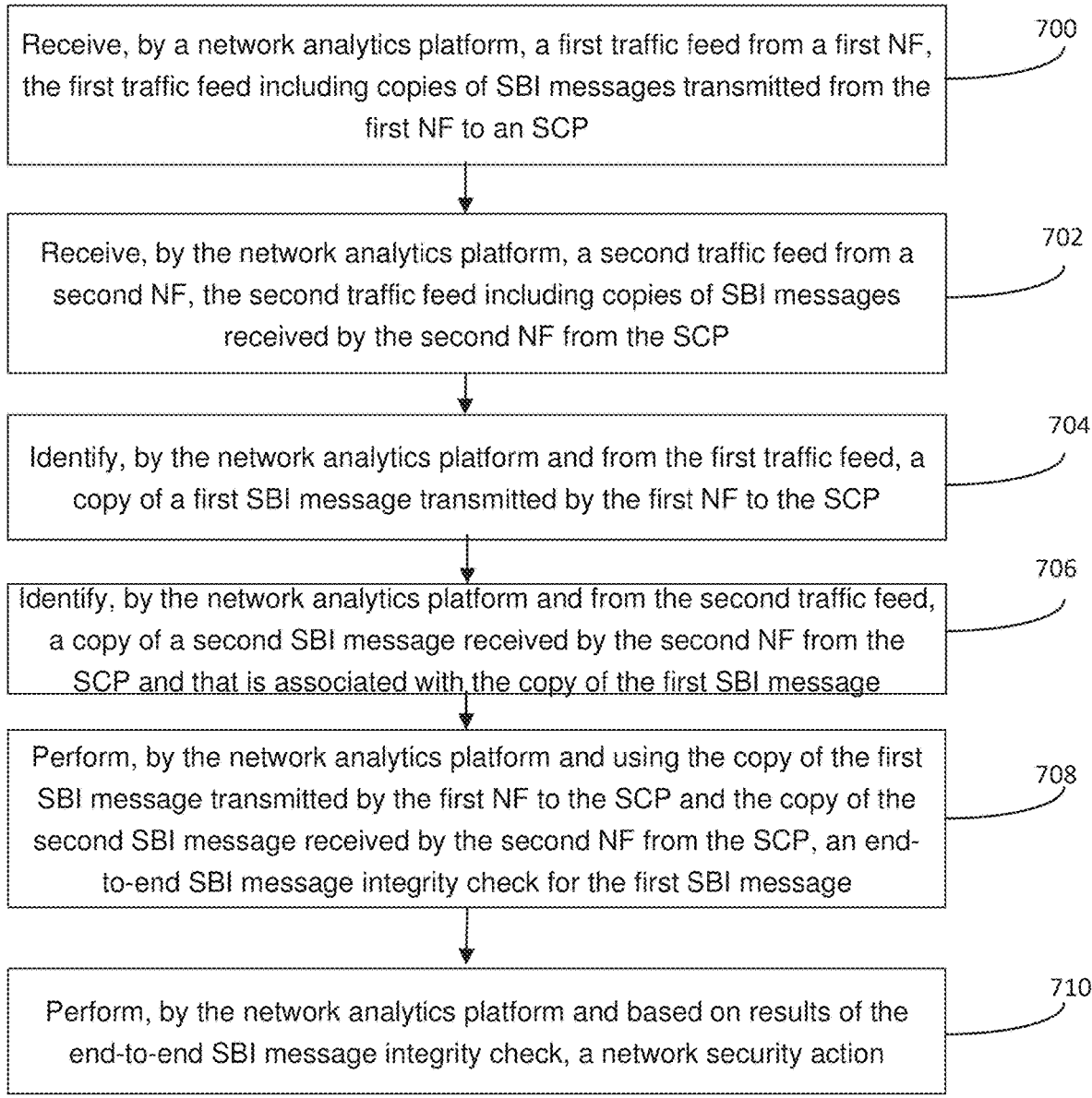
FIG. 7 is a flow chart illustrating an exemplary process for end-to-end message integrity checking for SBI messages communicated via an SCP.

FIG. 7 is a flow chart illustrating an exemplary process for end-to-end message integrity checking for SBI messages communicated via an SCP. Referring to FIG. 7, in step 700, the process includes receiving, by a network analytics platform, a first traffic feed from a first NF, the first traffic feed including copies of SBI messages transmitted from the first NF to an SCP. For example, a producer or consumer NF may establish an authenticated connection, such as a TLS connection, with network analytics platform 300 and begin sending, to network analytics platform 300 over the TLS connection, a traffic feed including copies of SBI messages transmitted by the NF to an SCP. The producer or consumer NF may include correlation IDs in the message copies transmitted to network analytics platform 300.

In step 702, the process further includes receiving, by the network analytics platform, a second traffic feed from a second NF, the second traffic feed including copies of SBI messages received by the second NF from the SCP. For example, a second producer or consumer NF may establish an authenticated connection, such as a TLS connection, with network analytics platform 300 and begin sending, to network analytics platform 300 over the TLS connection, a traffic feed including copies of SBI messages received by the second NF from the SCP. These message copies may also include the correlation IDs generated by the transmitting NFs.

In step 704, the process further includes identifying, by the network analytics platform and from the first traffic feed, a copy of a first SBI message transmitted by the first NF to the SCP. For example, network analytics platform 300 may read the correlation ID from a message copy in the traffic feed from the first NF, determine that the correlation ID does not match the correlation ID of a previously received SBI message, and store the message copy including the correlation ID in the end-to-end-message integrity checking database.

In step 706, the process further includes identifying, by the network analytics platform and from the second traffic feed, a copy of a second SBI message received by the second NF from the SCP and that is associated with the copy of the first SBI message. For example, network analytics platform 300 may read the correlation ID from a message copy in the traffic feed from the second NF, determine that the correlation ID matches the correlation ID of a previously received SBI message. When the correlation IDs match, network analytics platform 300 determines that the messages are associated with each other, i.e., that the second message copy and the first message copy are associated with the same SBI request message transmitted by the first NF and should have message attribute values that are identical, excluding the attributes that are modified by the SCP during normal operation, e.g. 3GPP-defined operation, of the SCP.

Examples of headers that are modified, added, and not modified by the SCP performing its 3GPP-defined (normal) operation are described above and in 3GPP TS 29.500 i50, the disclosure of which is incorporated herein by reference in its entirety.

In step 708, the process further includes performing, by the network analytics platform and using the copy of the first SBI message transmitted by the first NF to the SCP and the copy of the second SBI message received by the second NF from the SCP, an end-to-end SBI message integrity check for the first SBI message. For example, network analytics platform 300 may compare predetermined message attribute values from the first message copy with corresponding message attribute values from the second message copy. The message attribute values that are compared may be defined by the network operator and stored as configuration parameters of network analytics platform 300 in the end-to-end SBI message integrity checking database. The message attribute values may be compared directly with each other, or network analytics platform 300 may compute hashes of the message attribute values and compare the hashes.

In step 710, the process further includes performing, by the network analytics platform and based on results of the end-to-end SBI message integrity check, a network security action. For example, if the end-to-end SBI message integrity check fails, network analytics platform 300 may generate an alert message including details of the failure and send the alert message to the network operator. Exemplary details of the failure that may be communicated in the alert message include an identifier of the message type for which the end-to-end SBI message integrity check failed, an identifier of the changed message attribute that resulted in the failure, the original value of the changed message attribute, the modified value of the changed message attribute, identifiers of the source and target NFs for the SBI message, and an identifier of the SCP that modified the message attribute value. The network operator may then take appropriate action, such as taking the SCP out of service, removing the hacker code, and subsequently putting the SCP back into service after the hacker code has been removed.

Exemplary advantages of the subject matter described herein include limiting the number of successful security attacks by hacker code running on SCPs by identifying unauthorized message parameter modifications by the SCP so that the SCP can be taken out of service until the hacker code is removed. By identifying unauthorized message attribute value modifications, the subject matter described herein enhances network security.

Although the examples described above illustrate end-to-end message integrity checking for a network that includes a single SCP between the source and target NFs, it should also be noted that the end-to-end message integrity checking performed herein can also be performed in network involving multiple SCPs between the source and target NF. In a multi-SCP-hop message integrity check, network analytics platform 300 could compare the message attribute values from the SBI message copies received by each SCP and by the target NF with the message attribute values from the SBI message copy transmitted by the source NF to identify which of the SCPs caused the end-to-end message integrity check to fail.

The disclosure of each of the following references is hereby incorporated herein by reference in its entirety.

REFERENCES 1. 3$^{rd}$ Generation Partnership Project; Technical Specification Group Core Network and Terminals; 5G System; Network Function Repository Services; Stage 3 (Release 18) 3GPP TS 29.510 V18.6.0 (2024-03)
2. 3$^{rd}$ Generation Partnership Project; Technical Specification Group Core Network and Terminals; 5G System; Technical Realization of Service Based Architecture; Stage 3 (Release 18) 3GPP TS 29.500 V18.5.0 (2024-03)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for checking end-to-end service-based interface (SBI) message integrity using a network analytics platform, the method comprising:
   receiving, by a network analytics platform, a first traffic feed from a first network function (NF), the first traffic feed including copies of SBI messages transmitted from the first NF to a service communication proxy (SCP);
   receiving, by the network analytics platform, a second traffic feed from a second NF, the second traffic feed including copies of SBI messages received by the second NF from the SCP;
   identifying, by the network analytics platform and from the first traffic feed, a copy of a first SBI message transmitted by the first NF to the SCP;
   identifying, by the network analytics platform and from the second traffic feed, a copy of a second SBI message received by the second NF from the SCP and that is associated with the copy of the first SBI message;
   performing, by the network analytics platform and using the copy of the first SBI message transmitted by the first NF to the SCP and the copy of the second SBI message received by the second NF from the SCP, an end-to-end SBI message integrity check for the first SBI message; and
   performing, by the network analytics platform and based on results of the end-to-end SBI message integrity check, a network security action.

2. The method of claim 1 wherein identifying the copy of the first SBI message transmitted by the first NF to the SCP includes identifying a copy of an SBI request message transmitted by the first NF.

3. The method of claim 2 wherein identifying the copy of the second SBI message received by the second NF from the SCP includes identifying a copy of an SBI request message received by the second NF.

4. The method of claim 1 wherein identifying the copy of the first SBI message transmitted by the first NF to the SCP includes identifying a copy of an SBI response message.

5. The method of claim 4 wherein identifying the copy of the second SBI message received by the second NF includes identifying a copy of an SBI response message received by the second NF.

6. The method of claim 1 wherein identifying the copy of the second SBI message that is associated with the copy of the first SBI message includes reading a correlation ID from the copy of the first SBI message and using the correlation ID to locate the copy of the second SBI message in an end-to-end SBI message integrity checking database maintained by the network analytics platform.

7. The method of claim 1 wherein performing the end-to-end SBI message integrity check includes:

comparing message attribute values in the copy of the first SBI message with message attribute values in the copy of the second SBI message; and determining that one or more of the message attribute values in the copy of the first SBI message do not match one or more of the message attribute values in the copy of the second SBI message.

8. The method of claim 7 wherein performing the network security action includes generating an indication of failure of the end-to-end SBI message integrity check and communicating the indication of failure of the end-to-end SBI message integrity check to a network operator.

9. The method of claim 7 wherein performing the end-to-end SBI message integrity check comprises including, in the comparing, message attribute values that should not be modified during Third Generation Partnership Project (3GPP)-defined operation of the SCP.

10. The method of claim 7 wherein performing the end-to-end SBI message integrity check comprises excluding, from the comparing, message attribute values that are modified by the SCP during Third Generation Partnership Project (3GPP)-defined operation of the SCP.

11. A system for checking end-to-end service-based interface (SBI) message integrity using a network analytics platform, the system comprising:

a network analytics platform including at least one processor and a memory; and an end-to-end SBI message integrity checker implemented by the at least one processor for:

receiving a first traffic feed from a first network function (NF), the first traffic feed including copies of SBI messages transmitted from the first NF to a service communication proxy (SCP);

receiving a second traffic feed from a second NF, the second traffic feed including copies of SBI messages received by the second NF from the SCP;

identifying, from the first traffic feed, a copy of a first SBI message transmitted by the first NF to the SCP;

identifying, from the second traffic feed, a copy of a second SBI message received by the second NF from the SCP and that is associated with the copy of the first SBI message;

performing, using the copy of the first SBI message transmitted by the first NF to the SCP and the copy of the second SBI message received by the second NF from the SCP, an end-to-end SBI message integrity check for the first SBI message; and performing, by the network analytics platform and based on results of the end-to-end SBI message integrity check, a network security action.

12. The system of claim 11 wherein the copy of the first SBI message transmitted by the first NF to the SCP comprises a copy of an SBI request message transmitted by the first NF.

13. The system of claim 12 wherein the copy of the second SBI message received by the second NF from the SCP comprises a copy of an SBI request message received by the second NF.

14. The system of claim 11 wherein the copy of the first SBI message transmitted by the first NF to the SCP comprises a copy of an SBI response message transmitted by the first NF.

15. The system of claim 14 wherein the copy of the second SBI message received by the second NF from the SCP comprises a copy of an SBI response message received by the second NF.

16. The system of claim 11 wherein the end-to-end SBI message integrity checker is configured to identify the copy of the second SBI message that is associated with the copy of the first SBI message by reading a correlation ID from the copy of the first SBI message and using the correlation ID to locate the copy of the second SBI message in an end-to-end SBI message integrity checking database maintained by the network analytics platform.

17. The system of claim 11 wherein the end-to-end SBI message integrity checker is configured to perform the end-to-end SBI message integrity check by:

comparing message attribute values in the copy of the first SBI message with message attribute values in the copy of the second SBI message; and determining that one or more of the message attribute values in the copy of the first SBI message do not match one or more of the message attribute values in the copy of the second SBI message.

18. The system of claim 17 wherein the end-to-end SBI message integrity checker is configured to perform the network security action by generating an indication of failure of the end-to-end SBI message integrity check and communicate the indication of failure of the end-to-end SBI message integrity check to a network operator.

19. The system of claim 17 wherein the end-to-end SBI message integrity checker is configured to perform the end-to-end SBI message integrity check by including, in the comparing, message attribute values that should not be modified during Third Generation Partnership Project (3GPP)-defined operation of the SCP and excluding, from the comparing, message attribute values that are modified by the SCP during 3GPP-defined operation of the SCP.

20. A non-transitory computer readable medium having stored thereon executable instructions that when executed by a processor of a computer control the computer to perform steps comprising:

receiving, by a network analytics platform, a first traffic feed from a first network function (NF), the first traffic feed including copies of SBI messages transmitted from the first NF to a service communication proxy (SCP);

receiving, by the network analytics platform, a second traffic feed from a second NF, the second traffic feed including copies of service-based interface (SBI) messages received by the second NF from the SCP;

identifying, by the network analytics platform and from the first traffic feed, a copy of a first SBI message transmitted by the first NF to the SCP;

identifying, by the network analytics platform and from the second traffic feed, a copy of a second SBI message received by the second NF from the SCP and that is associated with the copy of the first SBI message;

performing, by the network analytics platform and using the copy of the first SBI message transmitted by the first NF to the SCP and the copy of the second SBI message received by the second NF from the SCP, an end-to-end SBI message integrity check for the first SBI message; and performing, by the network analytics platform and based on results of the end-to-end SBI message integrity check, a network security action.

* * * * *